(12) United States Patent
Choi et al.

(10) Patent No.: US 11,568,647 B2
(45) Date of Patent: Jan. 31, 2023

(54) LEARNING APPARATUS AND METHOD FOR CREATING EMOTION EXPRESSION VIDEO AND APPARATUS AND METHOD FOR EMOTION EXPRESSION VIDEO CREATION

(71) Applicant: RESEARCH COOPERATION FOUNDATION OF YEUNGNAM UNIVERSITY, Gyeongsangbuk-do (KR)

(72) Inventors: Gyu Sang Choi, Daegu-si (KR); Jong Ho Han, Gyeongsangbuk-do (KR); Hyun Kwang Shin, Gyeongsangbuk-do (KR)

(73) Assignee: RESEARCH COOPERATION FOUNDATION OF YEUNGNAM UNIVERSITY, Gyeongsangbuk-Do (KR)

( * ) Notice: Subject to any disclaimer, the term of this patent is extended or adjusted under 35 U.S.C. 154(b) by 149 days.

(21) Appl. No.: 17/084,877

(22) Filed: Oct. 30, 2020

(65) Prior Publication Data
US 2021/0406554 A1    Dec. 30, 2021

(30) Foreign Application Priority Data
Jun. 24, 2020   (KR) .......................... 10-2020-0077424

(51) Int. Cl.
| | |
|---|---|
| G06K 9/00 | (2022.01) |
| G06V 20/40 | (2022.01) |
| G06N 3/08 | (2006.01) |
| G06K 9/62 | (2022.01) |
| G06N 3/04 | (2006.01) |

(Continued)

(52) U.S. Cl.
CPC .......... *G06V 20/49* (2022.01); *G06K 9/6215* (2013.01); *G06N 3/04* (2013.01); *G06N 3/08* (2013.01); *G06V 10/751* (2022.01); *G06V 40/167* (2022.01); *G06V 40/169* (2022.01); *G06V 40/176* (2022.01)

(58) Field of Classification Search
CPC .......... G06K 9/00765; G06K 9/00261; G06K 9/00275; G06K 9/00315; G06K 9/6202; G06K 9/6215; G06N 3/04; G06N 3/08
See application file for complete search history.

(56) References Cited

U.S. PATENT DOCUMENTS

2019/0392580 A1 * 12/2019 Kapil ................. G06V 10/82
2020/0372694 A1 * 11/2020 Hwang ............... G06N 3/0454
(Continued)

FOREIGN PATENT DOCUMENTS

KR    10-2019-0080415 A    7/2019

*Primary Examiner* — Dhaval V Patel
(74) *Attorney, Agent, or Firm* — The PL Law Group, PLLC (57) ABSTRACT

A learning apparatus for creating an emotion expression video according to an embodiment disclosed include first generative adversarial networks (GAN) that receive text for creating an emotion expression video, extract vector information by performing embedding on the input text, and create an image based on the extracted vector information, and second generative adversarial networks that receive an emotion expression image and a frame of comparison video, and create a frame of emotion expression video from the emotion expression image and the frame of comparison video.

15 Claims, 8 Drawing Sheets

(51) Int. Cl.
*G06V 10/75* (2022.01)
*G06V 40/16* (2022.01)

(56) References Cited

U.S. PATENT DOCUMENTS

2021/0097372 A1* 4/2021 Lee .................... G06N 3/088
2021/0158503 A1* 5/2021 Li ..................... G06K 9/6256

* cited by examiner

LEARNING APPARATUS AND METHOD FOR CREATING EMOTION EXPRESSION VIDEO AND APPARATUS AND METHOD FOR EMOTION EXPRESSION VIDEO CREATION

CROSS-REFERENCE TO RELATED APPLICATION

This application claims the benefit under 35 USC § 119(a) of Korean Patent Application No. 10-2020-0077424, filed on Jun. 24, 2020, in the Korean Intellectual Property Office, the entire disclosure of which is incorporated herein by reference for all purposes.

BACKGROUND

1. Field

Embodiments of the present invention relate to technology of emotion expression video creation.

2. Description of Related Art

A generative model refers to a model for directly or indirectly obtaining a distribution of given data and creating data based on the distribution. As a deep learning-based image generative model, representatively, PixelCNN and a generative adversarial network (GAN) have emerged as representative models, and in recent years, in particular, the GAN has been actively studied as an image generative model.

Such a GAN exhibits very good performance when an image intended to be created is relatively simple or distributions in datasets are similar. For example, when creating a human face image, a human face can be realistically created from text created mainly based on a human face style (eye, nose, mouth, and hair style).

However, since such an image generative model creates a single image in consideration of only the face style, there is a problem in that it is difficult to provide various visual information on emotion expression.

SUMMARY

Embodiments of the present invention are for creating an emotion expression video as well as a human face image when a user inputs text of a face style and emotion expression.

A learning apparatus for creating an emotion expression video according to an embodiment disclosed includes first generative adversarial networks (GAN) that receive text for creating an emotion expression video, extract vector information by performing embedding on the input text, and create an image based on the extracted vector information, and second generative adversarial networks that receive an emotion expression image and a frame of comparison video and create a frame of emotion expression video the emotion expression image and the frame of comparison video.

The first generative adversarial networks may include a first generator that extracts vector information by performing embedding on the input text and creates an image by inputting the extracted vector information into a deconvolution neural network, and a first discriminator that compares the image created from the first generator with a preset comparison image, determines whether or not the input image is a comparison image or a created image according to the comparison result, and feeds the determination result back to the first generator.

The first discriminator may input the image created from the first generator into a convolution neural network to calculate and compare a similarity with the comparison image.

The second generative adversarial networks may include a second generator that receives the emotion expression image and the comparison video frame, calculates an emotion expression change degree of the comparison video frame with respect to emotion expression of the emotion expression image from the emotion expression image and the comparison video frame, and creates the frame of emotion expression video using the emotion expression image and the calculated emotion expression change degree, and a second discriminator that compares the frame of emotion expression video created from the second generator with a preset frame of comparison video, determines whether the input image is a frame of comparison video or a frame of emotion expression video according to the comparison result, and feeds the determination result back to the second generator.

The emotion expression image is an image classified into an emotion class according to an emotional element included in the text, and the emotion class may include at least one of happiness, sadness, surprise, fear, anger, contempt, and disgust.

The second generator may include an autoencoder including an encoder unit that extracts vector information on the emotion expression image to calculate a first feature value, extracts vector information on a direction in which emotion expression of the emotion expression image is to be changed to calculate a second feature value, and extracts vector information on the comparison image to calculate a third feature value, a conversion unit that calculates the emotion expression change degree based on the first feature value, the second feature value, and the third feature value, and calculates a final feature value using the first feature value, the second feature value, and the emotion expression change degree, and a decoder unit that creates the frame of emotion expression video based on the final feature value.

An apparatus for emotion expression video creation according to an embodiment disclosed include first generative adversarial networks (GAN) that receive text for creating an emotion expression video, extract vector information by performing embedding on the input text, and create an image based on the extracted vector information, a classifier that receives the text and classifies an emotion class according to an emotional element included in the input text, and second generative adversarial networks that receive the image created by the first generative adversarial networks and the emotion class classified by the classifier, and creates a frame of emotion expression video from the input image and the emotion class.

The second generative adversarial networks may extract an emotion expression change degree corresponding to the emotion class classified by the classifier and create the frame of emotion expression video using the image created by the first generative adversarial networks and the emotion expression change degree.

The emotion expression image is an image classified into an emotion class according to an emotional element included in the text, and the emotion class may include at least one of happiness, sadness, surprise, fear, anger, contempt, and disgust.

The second generative adversarial networks may create the emotion expression video by sequentially creating at least one frame after the frame of emotion expression video.

According to embodiments of the present invention, an image matching text may be created by creating a video based on a feature of text contents in consideration of the feature.

In addition, according to embodiments of the present invention, when a user inputs a desired face style and emotion expression, by creating an emotion expression image including emotions as well as a human face image, the user can create a desired image with only a simple description in a social network, etc., thereby improving communication.

DETAILED DESCRIPTION

Hereinafter, specific embodiments of the present invention will be described with reference to the accompanying drawings. The following detailed description is provided to aid in a comprehensive understanding of a method, a device and/or a system described in the present specification. However, the detailed description is only for illustrative purpose and the present invention is not limited thereto.

In describing the embodiments of the present invention, when it is determined that a detailed description of known technology related to the present invention may unnecessarily obscure the gist of the present invention, the detailed description thereof will be omitted. In addition, terms to be described later are terms defined in consideration of functions in the present invention, which may vary depending on intention or custom of a user or operator. Therefore, the definition of these terms should be made based on the contents throughout this specification. The terms used in the detailed description are only for describing the embodiments of the present invention and should not be used in a limiting sense. Unless explicitly used otherwise, an expression in a singular form includes a meaning of a plural form. In this description, expressions such as "including" or "comprising" are intended to indicate certain properties, numbers, steps, elements, and some or combinations thereof, and such expressions should not be interpreted to exclude the presence or possibility of one or more other properties, numbers, steps, elements other than those described, and some or combinations thereof.

Figure 1:
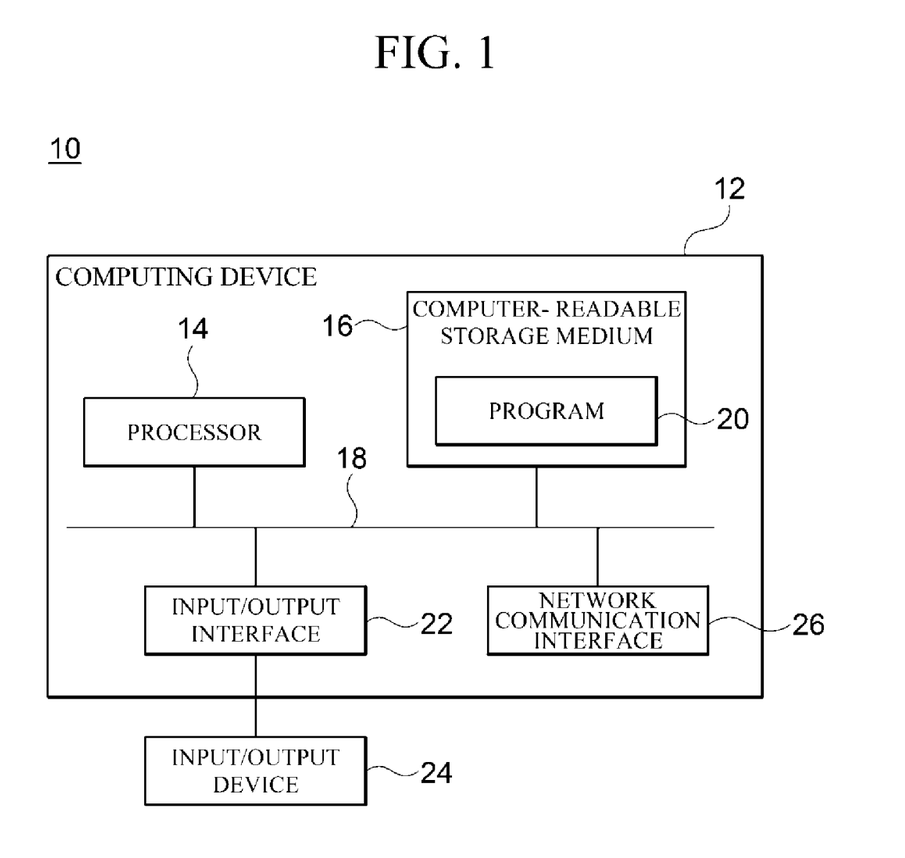
FIG. 1 is a block diagram illustratively describing a computing environment including a computing device suitable for use in exemplary embodiments.

FIG. 1 is a block diagram for illustratively describing a computing environment 10 that includes a computing device suitable for use in exemplary embodiments. In the illustrated embodiment, each component may have different functions and capabilities in addition to those described below, and additional components may be included in addition to those described below.

The illustrated computing environment 10 includes a computing device 12. In an embodiment, the computing device 12 may be a learning apparatus 100 for creating the emotion expression video. In addition, the computing device 12 may be an apparatus 800 for emotion expression video creation.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured to cause the computing device 12 to perform operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

Figure 2:
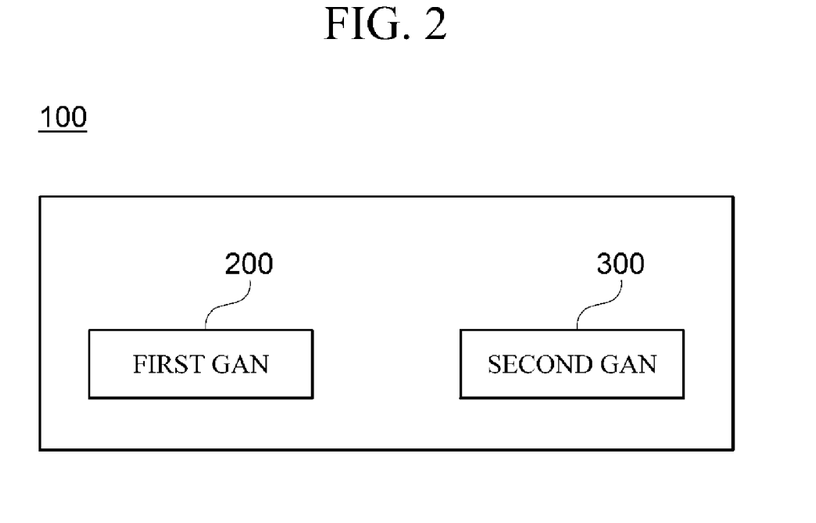
FIG. 2 is a block diagram illustrating a learning apparatus for creating an emotion expression video according to an embodiment of the present invention.

FIG. 2 is a block diagram illustrating a learning apparatus for creating an emotion expression video according to an embodiment of the present invention.

As illustrated in FIG. 2, the learning apparatus 100 for creating the emotion expression video according to an embodiment of the present invention may include first generative adversarial networks (GAN) 200 (hereinafter referred to as "first GAN") and second generative adversarial networks 300 (hereinafter referred to as "second GAN").

Meanwhile, the generative hostile networks (GAN) according to an embodiment of the present invention may be composed of two networks including a generator and a discriminator. The generator learns given data and creates similar data from the given data, as the role of the generative model. In addition, the discriminator is a type of classifier that obtains data created by the generator and distinguishes whether the data is data created from the generator or actual data. Therefore, the generator is intended to create data similar to the data, and the discriminator is intended to classify the created data and the actual data. Thus, the two are called networks of the minimax relationship.

The first GAN 200 may receive text for creating an emotion expression video, extract vector information by performing embedding on the input text, and create an image based on the extracted vector information. For example, the first GAN 200 may use a deep convolutional generative adversarial network (DC-GAN).

In embodiments of the present invention, the text may include various elements, such as external elements of an object, an emotional element (expression of emotion) of the object, etc. The external elements of the object may include eyes, nose, mouth, and hair style of the object, and the emotional element of the object may include expression of emotion. The image created by the first GAN 200 may create a face image according to the text.

Figure 3:
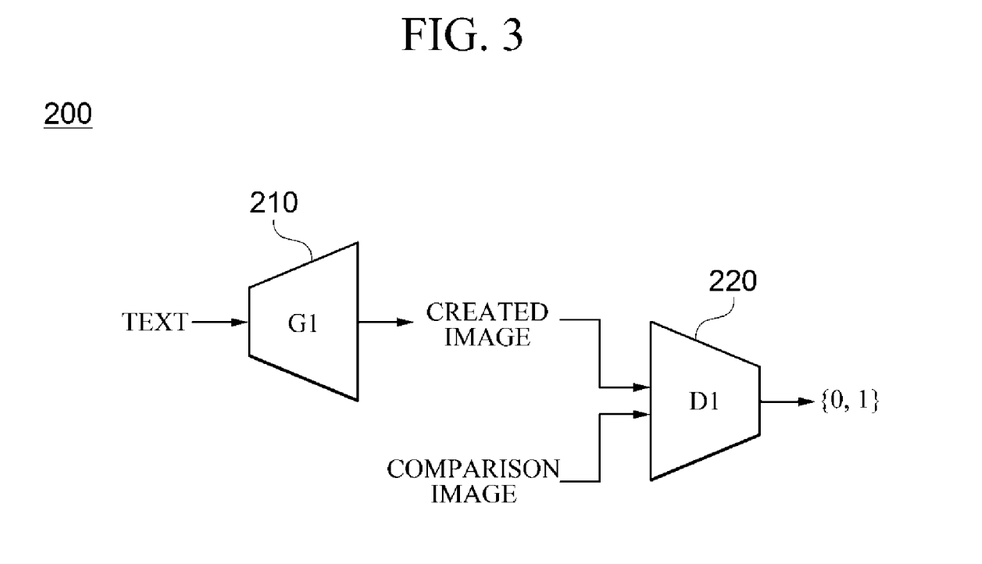
FIG. 3 is a block diagram for describing first generative adversarial networks in the learning apparatus for creating the emotion expression video according to the embodiment of the present invention.

FIG. 3 is a block diagram illustrating the first generative adversarial networks in the learning apparatus for creating the emotion expression video according to an embodiment of the present invention.

As illustrated in FIG. 3, the first GAN 200 according to an embodiment of the present invention may include a first generator 210 (G1) and a first discriminator 220 (D1).

The first generator 210 may receive text for creating an emotion expression video, and may extract vector information by performing embedding on the input text. For example, the first generator 210 may use skip-thought to perform embedding on the input text. The skip-thought is a method of vectorizing meaning of words in consideration of the similarity between words, and can encode the input text into a 4800-dimensional vector. Meanwhile, in this case, skip-thought is used to perform embedding on the text, but is not limited thereto, and word2vec, sent2vec, etc. may be used.

In addition, the first generator 210 may create an image based on the extracted vector information using a deconvolution model. For example, the deconvolution model may be composed of four deconvolution layers and a tanh layer. In each deconvolution layer, batch normalization and a rectified linear unit (ReLU) can be used, and the input vector can be converted into a tensor of 4×4×512 (height 4, width 4, channel 512) by adjusting the dimensions of the input vector.

Next, by reducing the number of channels and increasing the height and width, the input vector can be converted into a tensor of 32×32×62 (height 32, width 32, channel 64). Finally, an RGB image of 64×64×3 can be created using the tanh.

The first discriminator 220 can learn the comparison image and the image created from the first generator 210 and determine whether or not the input image is a comparison image or a created image according to the learning result. Here, the comparison image may mean an image photographed by a photographing device such as a camera, and may be, for example, a human face image. The first discriminator 220 feeds the determination result back to the first generator 210 so that an image created by the first generator 210 may become more and more similar to the actual one. For example, the first discriminator 220 may determine whether or not the input image is the comparison image or the created image using a convolution model. The convolution model may be composed of four convolution layers, a dimensional extension layer, and a sigmoid layer. The RGB image of 64×64×3 can be converted into a 4×4×512 dimensional tensor by being passed through the convolution layer three times. Next, the RGB image is extended to 4×4×256 through the dimensional extension layer, and a value between 0 and 1 may be output by the sigmoid layer after being passed through the last convolutional layer). The first discriminator may output a value between 0 and 1 according to the similarity of the input image, and may output 1 in the case of the comparison image.

When the image created by the first generator 210 becomes sufficiently similar to the comparison image through the learning process described above, the first discriminator 220 cannot distinguish whether or not the input image is a comparison image or a created image. When the first GAN 200 reaches such a state, the learning process ends, and after that, the first generator 210 creates an image according to the input text.

Referring back to FIG. 2, the second GAN 300 may receive an emotion expression image and a frame of comparison video, and may create a frame of emotion expression video from the emotion expression image and the frame of comparison video.

Figure 4:
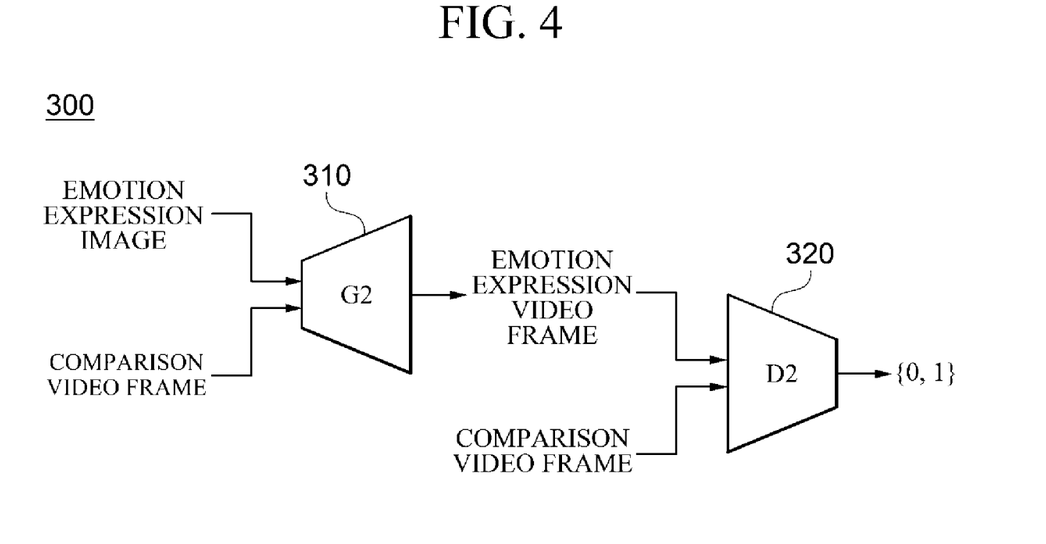
FIG. 4 is a block diagram for describing second generative adversarial networks in the learning apparatus for creating the emotion expression video according to the embodiment of the present invention.

FIG. 4 is a block diagram illustrating the second generative adversarial networks in the learning apparatus for creating the emotion expression video according to an embodiment of the present invention.

As illustrated in FIG. 4, the second GAN 300 according to an embodiment of the present invention may include a second generator 310 and a second discriminator 320.

In embodiments of the present invention, the text may include various elements, such as external elements of the object and an emotional element (expression of emotion) of the object. The external elements of the object may include eyes, nose, mouth, and hair style of the object, and the emotional element of the object may include expression of emotion. The video created by the second GAN 300 may create an emotion expression video according to an emotional element included in the text. Here, the emotion expression image may be an image representing the emotional element. For example, the emotion expression image may be a face image classified into an emotion class (e.g., happiness, sadness, surprise, fear, anger, contempt, disgust, etc.) according to the emotional element. In addition, the comparison video may be a video representing a movement of a face according to the emotional element.

The second generator 310 may receive the emotion expression image and the comparison video frame, calculate an emotion expression change degree of the comparison video frame with respect to emotion expression of the emotion expression image from the emotion expression image and the comparison video frame, and create a frame of emotion expression video using the emotion expression image and the calculated emotion expression change degree.

Specifically, the second generator 310 may receive the emotion expression image and the frame of comparison video, extract a first feature value $f_1$ and a second feature value $f_2$ from the emotion expression image, extract a third feature value $f_3$ from the frame of comparison video and calculate an emotion expression change degree $a_t$ based on the first feature value $f_1$, the second feature value $f_2$, and the third feature value $f_3$. The second generator 310 may calculate a final feature value $f_t$ using the first feature value $f_1$, the second feature value $f_2$, and the emotion expression change degree $a_t$, and create the frame of emotion expression video based on the final feature value $f_t$.

Figure 5:
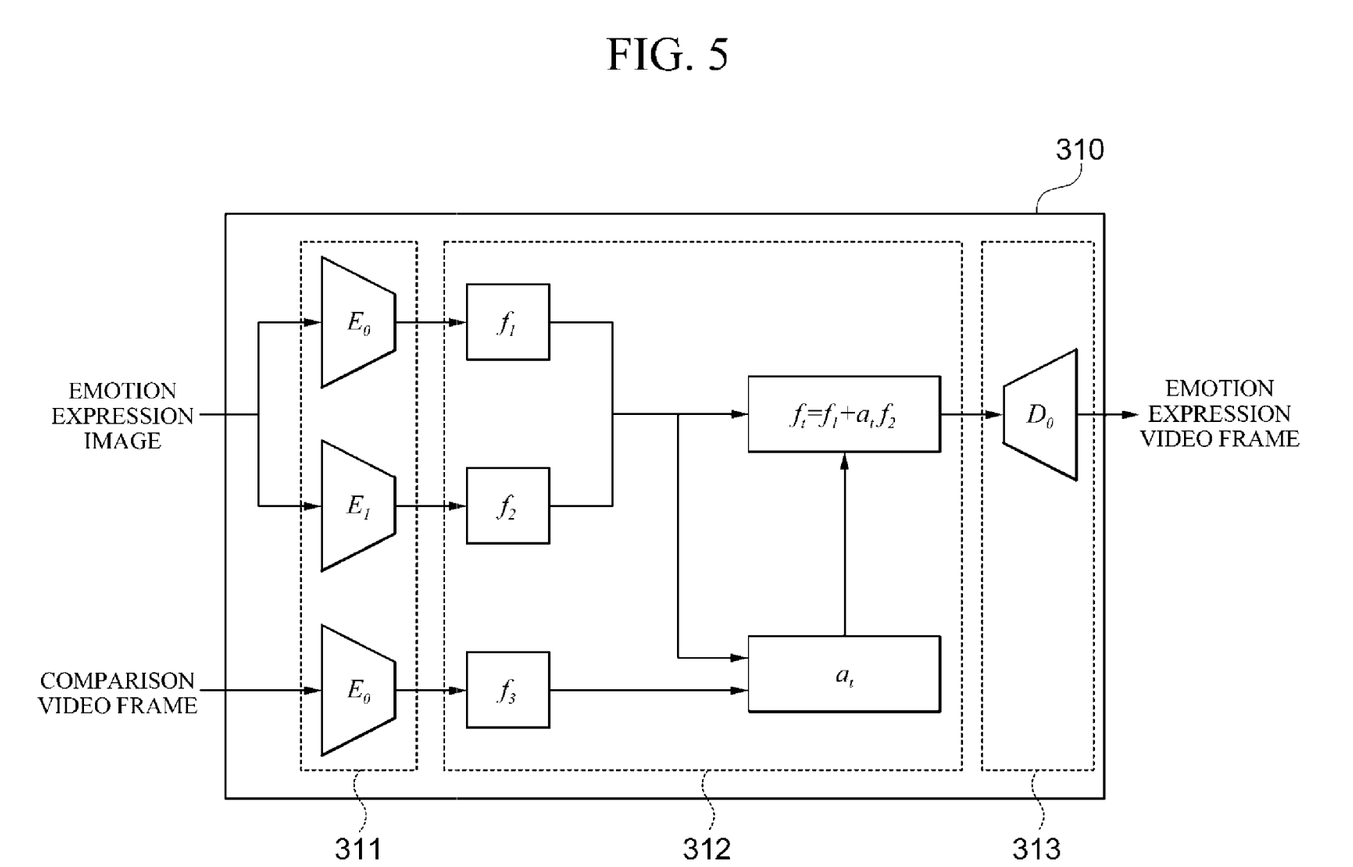
FIG. 5 is a block diagram for describing a second generator of the second generative adversarial networks in the learning apparatus for creating the emotion expression video according to the embodiment of the present invention.

FIG. 5 is a block diagram illustrating the second generator of the second generative adversarial networks in the learning apparatus for creating the emotion expression video according to an embodiment of the present invention.

As illustrated in FIG. 5, the second generator 310 may use an autoencoder based on deep learning. The second generator 310 may include an encoder unit 311, a conversion unit 312, and a decoder unit 313.

The encoder unit 311 may extract vector information on the emotion expression image through a basic encoder $E_0$ to calculate the first feature value $f_1$. In addition, the encoder unit 311 may extract vector information on a direction in which emotion expression (facial expression) of the emotion expression image is to be changed through a residual encoder Et to calculate the second feature value $f_2$. In addition, the encoder unit 311 may extract vector information on the comparison image through the basic encoder to calculate the third feature value $f_3$. The conversion unit 312 may calculate the emotion expression change degree $a_t$ through Equation 1 below.

$$a_t = \left| \frac{(f_3 - f_1)f_2}{f_2^2 f_2 + \varepsilon} \right| \qquad \text{Equation 1}$$

Here, the emotion expression change degree $a_t$ may be a value obtained by calculating an emotion expression (facial expression) change degree of the comparison video frame with respect to the emotion expression (facial expression) of the emotion expression image.

In addition, the conversion unit 312 may calculate the final feature value $f_t$ through Equation 2 below.

$$f_t = f_1 + a_t f_2 \qquad \text{Equation 2}$$

Here, the final feature value $f_t$ may be a value in which the emotion expression (facial expression) change degree of the frame of the comparison video is reflected in the emotion expression image.

The decoder unit 313 may create a frame of emotion expression video through a decoder Do based on the final feature value $f_t$.

The second discriminator 320 may learn the frame of comparison video and the frame of emotion expression video created from the second generator 310, and determine whether or not the input image is a frame of comparison image or a frame of emotion expression video according to the learning result. The second discriminator 320 feeds the determination result back to the second generator 310 so that the frame of emotion expression image created by the second generator 310 may become more and more similar to the actual one.

When the frame of emotion expression video created by the second generator 310 through the learning process described above becomes sufficiently similar to the frame of comparison video, the second discriminator 320 cannot distinguish whether or not the input frame is a frame of comparison video or a frame of emotion expression video. When the second GAN 300 reaches such a state, the learning process ends. In this case, the second GAN 300 may learn according to the classified emotion class. That is, the second GAN 300 may learn the emotion expression change degree $a_t$ for each emotion class by learning an emotion expression image classified according to an emotion class (e.g., happiness, sadness, surprise, fear, anger, contempt, disgust, etc.), and after that, the second generator 310 creates a frame according to the input image and emotion class. In addition, the second GAN 300 sequentially receives a next frame of comparison video, sequentially creates a frame after a frame of emotion expression image from the received next frame of comparison video, and sequentially connects the created frames to create a video.

Figure 6:
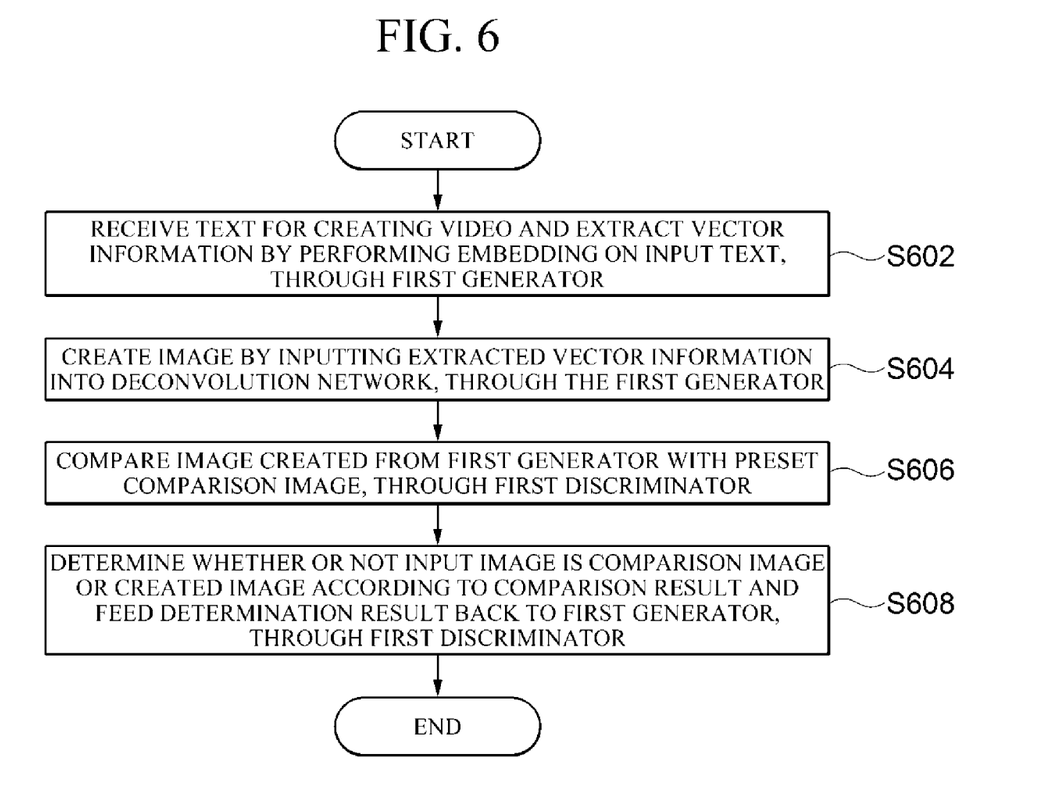
FIG. 6 is a flowchart for illustrating a learning method of the first generative adversarial networks in the learning apparatus for creating the emotion expression video according to the embodiment of the present invention.

FIG. 6 is a flowchart for describing a learning method of the first generative adversarial networks in the learning apparatus for creating the emotion expression video according to an embodiment of the present invention. As described above, the first generative adversarial networks 200 according to an embodiment of the present invention is may be executed in the computing device 12 that includes one or more processors and a memory storing one or more programs executed by the one or more processors. To this end, the first generative adversarial networks 200 may be implemented in the form of a program or software including one or more computer executable instructions and stored in the memory.

In addition, in the illustrated flowchart, the method is described by being divided into a plurality of steps, but at least some of the steps may be performed in a different order, performed together by being combined with other steps, omitted, performed by being divided into detailed steps, or performed by being added with one or more steps (not illustrated).

In step 602, the computing device 12 receives text for creating a video and extracts vector information by performing embedding on the input text, through the first generator 210.

In step 604, the computing device 12 creates an image by inputting the extracted vector information into a deconvolution neural network, through the first generator 210.

In step 606, the computing device 12 compares the image created from the first generator 210 with a preset comparison image, through the first discriminator 220.

In step 608, the computing device 12 determines whether or not the input image is a comparison image or a created image according to the comparison result and feeds the determination result back to the first generator 210, through the first discriminator 220.

Figure 7:
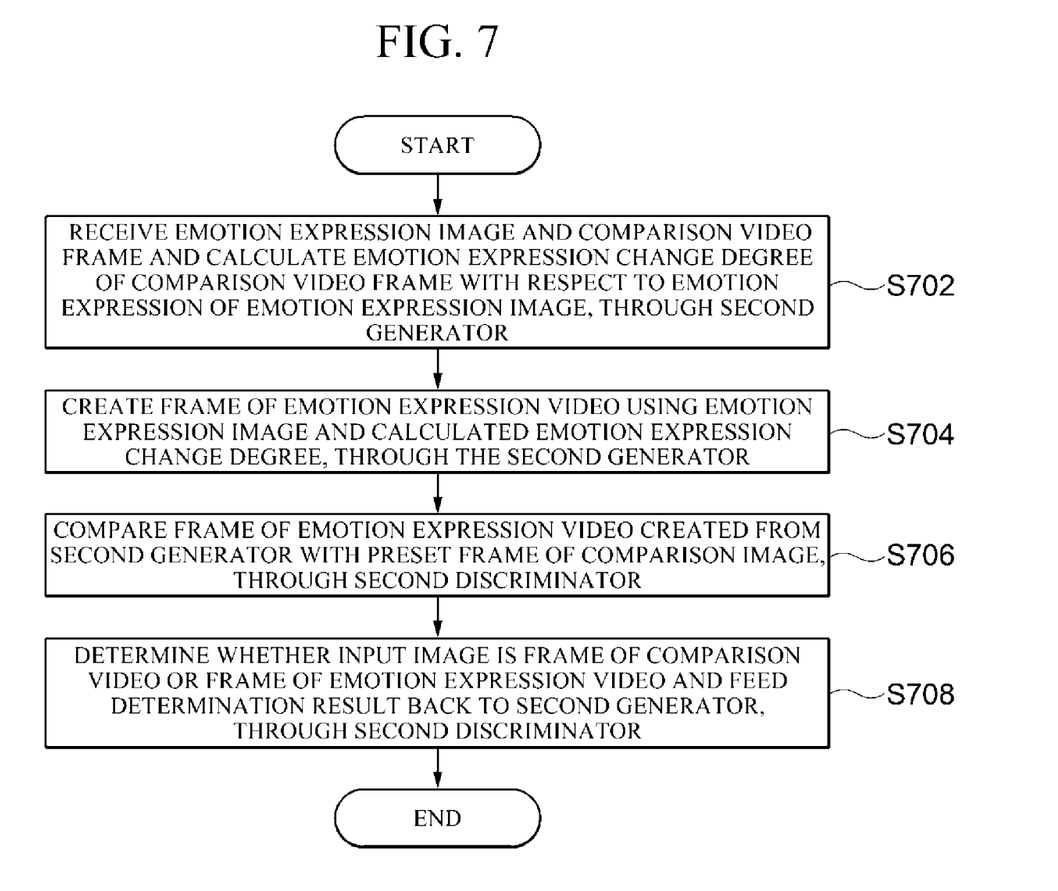
FIG. 7 is a flowchart illustrating a learning method of the second generative adversarial networks in the learning apparatus for creating the emotion expression video according to the embodiment of the present invention.

FIG. 7 is a flowchart illustrating a learning method of the second generative adversarial networks in the learning apparatus for creating the emotion expression video according to an embodiment of the present invention. As described above, the second generative adversarial networks 300 according to an embodiment of the present invention may be executed in the computing device 12 that includes one or more processors and a memory storing one or more programs executed by the one or more processors. To this end, the second generative adversarial networks 300 may be implemented in the form of a program or software including one or more computer executable instructions and stored in the memory.

In addition, in the illustrated flowchart, the method is described by being divided into a plurality of steps, but at least some of the steps may be performed in a different order, performed together by being combined with other steps, omitted, performed by being divided into detailed steps, or performed by being added with one or more steps (not illustrated).

In step 702, the computing device 12 receives an emotion expression image and a comparison video frame and calculates an emotion expression change degree of the comparison video frame with respect to emotion expression of the emotion expression image from the emotion expression image and the comparison video frame, through the second generator 310.

In step 704, the computing device 12 creates a frame of emotion expression video using the emotion expression image and the calculated emotion expression change degree, through the second generator 310.

In step 706, the computing device 12 compares the frame of emotion expression video created from the second generator 310 with a preset frame of comparison video, through the second discriminator 320.

In step 708, the computing device 12 determines whether the input image is a frame of comparison video or a frame of emotion expression video and feeds the determination result back to the second generator 310, through the second discriminator 320.

Figure 8:
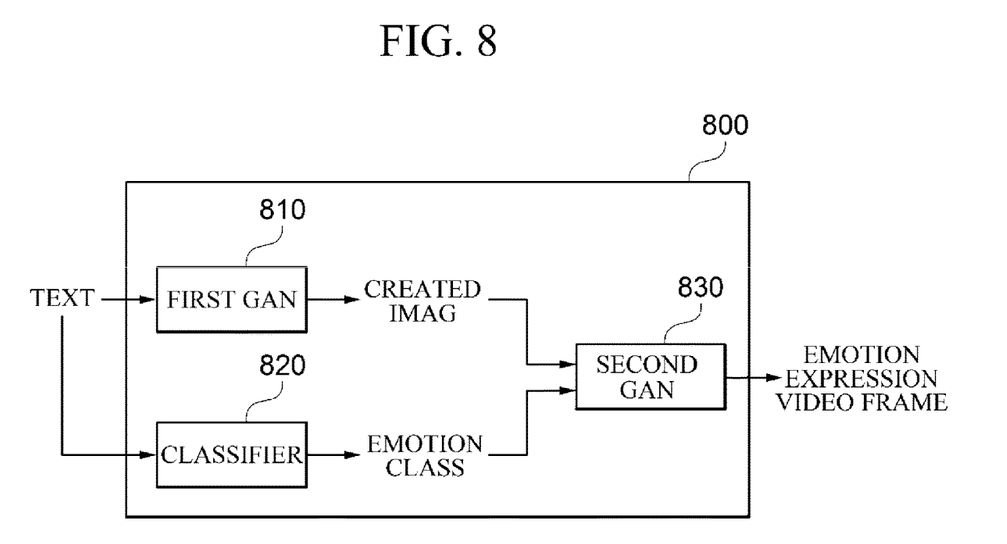
FIG. 8 is a block diagram illustrating an apparatus for an emotion expression video creation according to an embodiment of the present invention.

FIG. 8 is a block diagram illustrating an apparatus for emotion expression video creation according to an embodiment of the present invention. Since components corresponding to components in the embodiment of the present invention described with reference to FIGS. 2 to 4 perform functions which are the same as or similar to those described in the embodiment, a more detailed description thereof will be omitted. However, in this embodiment, the first GAN 810 and the second GAN 830 may be in a state in which learning has been completed.

As illustrated in FIG. 8, the apparatus 800 for emotion expression video creation according to an embodiment of the present invention may include first generative adversarial networks (GAN) 810 (hereinafter referred to as "first GAN"), a classifier 820, and second generative adversarial networks 830 (hereinafter referred to as "second GAN").

The first GAN 810 may receive text for creating an emotion expression video, extract vector information by performing embedding on the input text, and create an image based on the extracted vector information.

In embodiments of the present invention, the text may include various elements, such as external elements of an object, an emotional element (expression of emotion) of the object, etc. The external elements of the object may include eyes, nose, mouth, and hair style of the object, and the emotional element of the object may include expression of emotion. The image created by the first GAN 810 may create a face image according to the text.

The classifier 820 may receive the text and classify the emotion class according to the emotional element included in the input text. For example, the classifier 820 may classify the emotion class into happiness, sadness, surprise, fear, anger, contempt, disgust, etc. according to the emotional element.

The second GAN 830 may receive the image created by the first GAN 810 and the emotion class classified by the classifier, and create a frame of emotion expression video from the image and the emotion class. Specifically, the second GAN 830 may extract an emotion expression change degree corresponding to the emotion class classified by the classifier 820, and create a frame of emotion expression video using the image created by the first GAN 810 and the emotion expression change degree. In addition, the second GAN 830 may sequentially create frames after the frame of emotion expression video and sequentially connect the created frames to create the emotion expression video.

Therefore, according to embodiments of the present invention, when a user inputs a desired external element (face style) and emotional element (expression of emotion) by expressing the external element and emotional element in text, an emotion expression video including emotions as well as a human face image is created, so that the user can create a desired image with only a simple description in a social network, etc., thereby improving communication.

Figure 9:
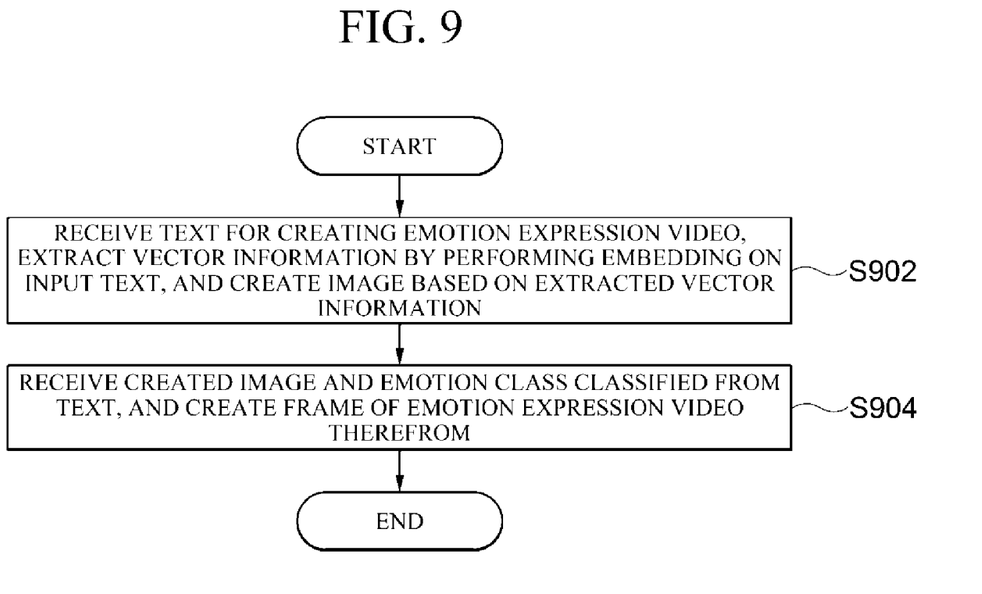
FIG. 9 is a flowchart for describing a method for an emotion expression video creation according to an embodiment of the present invention.

FIG. 9 is a flowchart for describing the method for emotion expression video creation according to an embodiment of the present invention. As described above, the method for emotion expression video creation according to an embodiment of the present invention may be executed in the computing device 12 that includes one or more processors and a memory storing one or more programs executed by the one or more processors. To this end, the method for emotion expression video creation may be implemented in the form of a program or software including one or more computer executable instructions and stored in the memory.

In addition, in the illustrated flowchart, the method is described by being divided into a plurality of steps, but at least some of the steps may be performed in a different order, performed together by being combined with other steps, omitted, performed by being divided into detailed steps, or performed by being added with one or more steps (not illustrated).

In step 902, the computing device 12 receives text for creating an emotion expression video, extracts vector information by performing embedding on the input text, and creates an image based on the extracted vector information, through the first GAN 810.

In step 904, the computing device 12 classifies an emotion class according to an emotional element included in the input text, through the classifier 820, receives the image created by the first GAN 810 and the emotion class classified by the classifier and creates a frame of emotion expression video from the image and the emotion class, through the second GAN 830. Meanwhile, the computing device 12 may sequentially create frames after the frame of emotion expression video and sequentially connect the created frames to create the emotion expression video.

Although the present invention has been described in detail through representative examples above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. A learning apparatus for creating an emotion expression video, comprising:

first generative adversarial networks (GAN) that receive text for creating an emotion expression video, extract vector information by performing embedding on the input text, and create an emotion expression image based on the extracted vector information; and second generative adversarial networks that receive the emotion expression image and a frame of comparison video, and create a frame of emotion expression video from the emotion expression image and the frame of comparison video, wherein the first generative adversarial networks comprises:
 a first generator configured to extract vector information by performing embedding on the input text and configured to create the emotion expression image by inputting the extracted vector information into a deconvolution neural network; and
 a first discriminator configured to compare the emotion expression image created from the first generator with a preset comparison image, determine whether or not the input image is a comparison image or a created image according to the comparison result, and feed the determination result back to the first generator, wherein the second generative adversarial networks comprises:
 a second generator configured to receive the emotion expression image and the comparison video frame, calculate an emotion expression change degree of the comparison video frame with respect to emotion expression of the emotion expression image from the emotion expression image and the comparison video frame, and create the frame of emotion expression video using the emotion expression image and the calculated emotion expression change degree, and
 a second discriminator configured to compare the frame of emotion expression video created from the second generator with a preset frame of comparison video, determine whether the input image is a frame of comparison video or a frame of emotion expression video according to the comparison result, and feed the determination result back to the second generator.

2. The learning apparatus of claim 1, wherein the first discriminator inputs the image created from the first generator into a convolution neural network to calculate and compares a similarity with the comparison image.

3. The learning apparatus of claim 1, wherein the emotion expression image is an image classified into an emotion class according to an emotional element included in the text, and the emotion class includes at least one of happiness, sadness, surprise, fear, anger, contempt, and disgust.

4. The learning apparatus of claim 3, wherein the second generator comprises an autoencoder comprising:
 an encoder unit that extracts vector information on the emotion expression image to calculate a first feature value, extracts vector information on a direction in which emotion expression of the emotion expression image is to be changed to calculate a second feature value, and extracts vector information on the comparison image to calculate a third feature value;
 a conversion unit that calculates the emotion expression change degree based on the first feature value, the second feature value, and the third feature value, and calculates a final feature value using the first feature value, the second feature value, and the emotion expression change degree; and
 a decoder unit that creates the frame of emotion expression video based on the final feature value.

5. A learning method for creating an emotion expression video performed in a computing device that includes one or more processors and a memory storing one or more programs executed by the one or more processors, the learning method comprising:
 by first generative adversarial networks (GAN), receiving text for creating an emotion expression video, extracting vector information by performing embedding on the input text and creating an emotion expression image based on the extracted vector information; and
 by second generative adversarial networks, receiving the emotion expression image and a frame of comparison video and creating a frame of emotion expression video from the emotion expression image and the frame of comparison video,
 wherein the creating of the emoticon expression image comprises:
  by a first generator, extracting vector information by performing embedding on the input text and creating the emotion expression image by inputting the extracted vector information into a deconvolution neural network; and
  by a first discriminator, comparing the emotion expression image created from the first generator with a preset comparison image, determining whether or not the input image is a comparison image or a created image according to the comparison result, and feeding the determination result back to the first generator,
 wherein the creating of the frame of the emotion expression video comprises:
  by a second generator, receiving the emotion expression image and the comparison video frame, calculating an emotion expression change degree of the comparison video frame with respect to emotion expression of the emotion expression image from the emotion expression image and the comparison video frame, and creating the frame of emotion expression video using the emotion expression image and the calculated emotion expression change degree; and
  by a second discriminator, comparing the frame of emotion expression video created from the second generator with a preset frame of comparison video, determining whether the input image is a frame of comparison video or a frame of emotion expression video according to the comparison result, and feeding the determination result back to the second generator.

6. The learning method of claim 5, wherein the first discriminator inputs the image created from the first generator into a convolution neural network to calculate and compare a similarity with the comparison image.

7. The learning method of claim 5, wherein the emotion expression image is an image classified into an emotion class according to an emotional element included in the text, and the emotion class includes at least one of happiness, sadness, surprise, fear, anger, contempt, and disgust.

8. The learning method of claim 7, wherein the second generator comprises an autoencoder comprising:
 an encoder unit that extracts vector information on the emotion expression image to calculate a first feature value, extracts vector information on a direction in which emotion expression of the emotion expression image is to be changed to calculate a second feature value, and extracts vector information on the comparison image to calculate a third feature value;

a conversion unit that calculates the emotion expression change degree based on the first feature value, the second feature value, and the third feature value, and calculates a final feature value using the first feature value, the second feature value, and the emotion expression change degree; and a decoder unit that creates the frame of emotion expression video based on the final feature value.

9. An apparatus for emotion expression video creation comprising:

first generative adversarial networks (GAN) that receive text for creating an emotion expression video, extract vector information by performing embedding on the input text, and create an image based on the extracted vector information;

a classifier that receives the text and classifies an emotion class according to an emotional element included in the input text; and second generative adversarial networks that receive the image created by the first generative adversarial networks and the emotion class classified by the classifier, and create a frame of emotion expression video from the input image and the emotion class.

10. The apparatus of claim 9, wherein the second generative adversarial networks extract an emotion expression change degree corresponding to the emotion class classified by the classifier and create the frame of emotion expression video using the image created by the first generative adversarial networks and the emotion expression change degree.

11. The apparatus of claim 10, wherein the emotion expression image is an image classified into an emotion class according to an emotional element included in the text, and the emotion class includes at least one of happiness, sadness, surprise, fear, anger, contempt, and disgust.

12. The apparatus of claim 9, wherein the second generative adversarial networks create the emotion expression video by sequentially creating at least one frame after the frame of emotion expression video.

13. A method for emotion expression video creation in a computing device that includes one or more processors and a memory storing one or more programs executed by the one or more processors, the method comprising:

by first generative adversarial networks (GAN), receiving text for creating an emotion expression video, extracting vector information by performing embedding on the input text, and creating an image based on the extracted vector information;

by a classifier, receiving the text and classifying an emotion class according to an emotional element included in the input text; and by a second generative adversarial network, receiving the image created by the first generative adversarial networks and the emotion class classified by the classifier, and creating a frame of emotion expression video from the input image and the emotion class.

14. The method of claim 13, wherein the creating the frame of emotion expression video further comprises:

by the second generative adversarial networks, extracting an emotion expression change degree corresponding to the emotion class classified by the classifier, and creating the frame of emotion expression video using the image created by the first generative adversarial networks and the emotion expression change degree.

15. The method of claim 13, wherein the creating the frame of emotion expression video further comprises:

by the second generative adversarial networks, creating the emotion expression video by sequentially creating at least one frame after the frame of emotion expression video.

\* \* \* \* \*